May 31, 1966 J. G. BARCOMB ET AL 3,254,237
TRANSISTOR LONG LINE DRIVER-TERMINATOR
Filed Dec. 23, 1963
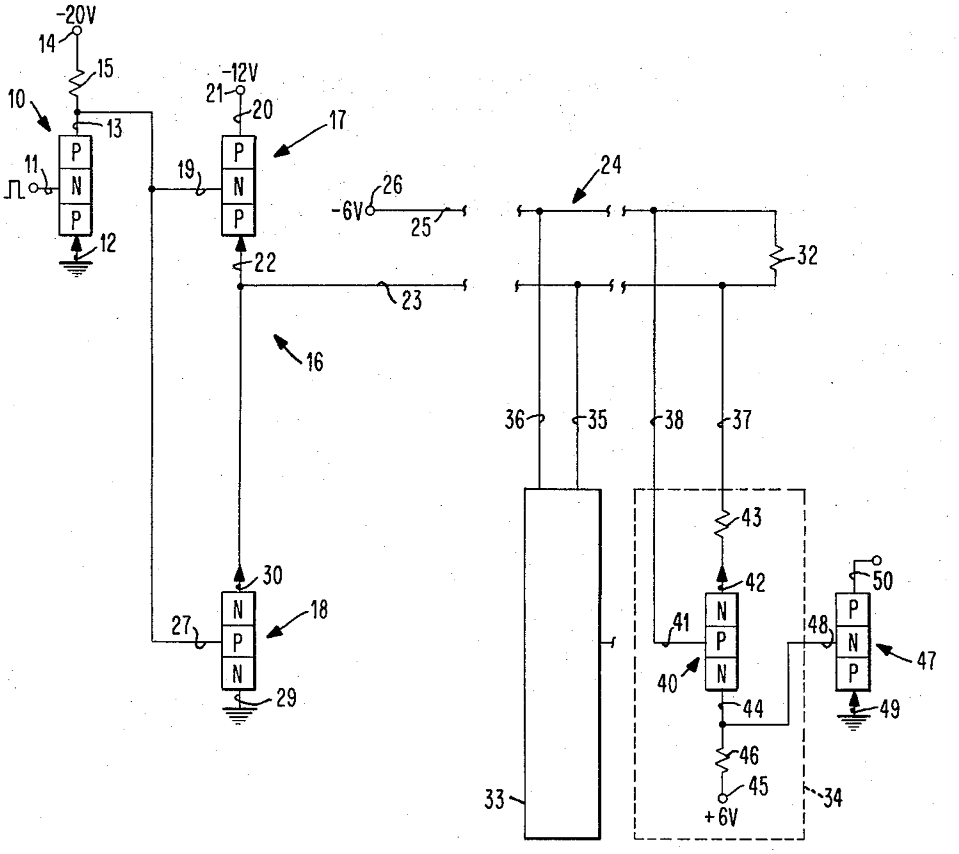
INVENTORS
JAMES G. BARCOMB
EUGENE T. KOZOL
BY John C Black
ATTORNEY

United States Patent Office 3,254,237
Patented May 31, 1966

3,254,237

TRANSISTOR LONG LINE DRIVER-TERMINATOR

James G. Barcomb, Endicott, and Eugene T. Kozol, Binghamton, N.Y., assignors to International Business Machines Corporation, New York, N.Y., a corporation of New York Filed Dec. 23, 1963, Ser. No. 332,397
3 Claims. (Cl. 307—88.5)

This invention is directed to an improved, economical drive-terminator circuit which is particularly well adapted to supply high drive currents over long lines with a high degree of reliability and maximum noise rejection.

The improved driver-terminator of the present invention has been designed, particularly for use in a data inquiry system wherein a plurality of inquiry stations are located at some distance from a central processing unit; however, it will be appreciated that the invention is not to be limited thereto and that the invention is to be limited only by the scope of the appended claims.

Frequently, there is a need for rapidly obtaining data stored in the magnetic disc files of a central processing system, for example, in response to inquiries to telephone and other utility company customer service departments. Remote inquiry stations are provided for service representatives for transmitting inquiries to the data processing system and for receiving the desired information in response to each inquiry. It becomes necessary therefore to transmit data and control signals in digital form.

In many instances, it becomes necessary or desirable to transmit these signals over relatively long distances (e.g. 2,500 feet or more), at relatively high current levels and at relatively high frequencies. It is this particular problem to which the improved line driver-terminator circuit of the present application is directed. Known circuits of simplified construction using conventional, inexpensive transistors are frequently limited to driving lines in the order of 100 feet to 300 feet.

It is therefore the primary object of the present invention to provide an improved drive-terminator circuit capable of delivering digital signals at relatively high current levels and at relatively high frequencies over long transmission lines. In the preferred embodiment of the present invention, the improved results are obtained by providing a line driver which is characterized by a complementary emitter follower with its output coupled to the line and by a transistor inverter with its output coupled to the input of the complementary emitter follower. The collector bias potential and the load resistor of the inverter are selected to assure operation of one of the complementary emitter followers heavily in saturation when it drives the line. A plurality of terminators each individual to a respective one of the inquiry stations are coupled to the transmission line at their respective inquiry stations. Each terminator includes a common base transistor amplifier with the base and emitter terminals being coupled to a respective conductor of the line. The station at the end of the line also includes an impedance terminating the line in its characteristic impedance. In the single embodiment disclosed, all terminators are driven by one driver simultaneously.

Reliability of operation in systems of this type wherein digital signals must be transmitted over long lines to low impedance terminating devices has presented serious problems to the designer. In known applications, it has been frequently necessary to resort to relatively expensive coaxial cable and to expensive, special drive transistors which can tolerate high power dissipation levels. With the use of the improved circuit of the present application, it has been found that very reliable operation can be obtained with inexpensive, twisted wire pair cables and the more conventional, inexpensive drive transistors.

Accordingly, it is another object of the present invention to provide a relatively economical long line driver-terminator circuit using conventional low-cost transistors and twisted wire cables.

It is another object of the present invention to provide a driver-terminator circuit of the type set forth in the preceding object which is capable of providing drive currents at relatively high current levels and relatively high frequencies.

The foregoing and other objects, features and advantages of the invention will be apparent from the following more particular description of a preferred embodiment of the invention, as illustrated in the accompanying drawing which is a schematic diagram of a driver-terminator circuit embodying the features of the invention.

The driver-terminator circuit of the preferred embodiment includes a transistor inverter 10 including a base terminal 11 adapted to receive input signals, an emitter terminal 12 connected to ground potential and a collector terminal 13 connected to a bias potential terminal 14 by way of a load impedance 15.

A complementary emitter follower circuit 16 includes a pair of emitter followers 17 and 18. The emitter follower 17 includes a base terminal 19 connected to the collector terminal 13, a collector terminal 20 connected to a bias potential terminal 21, and an emitter terminal 22 connected to one conductor 23 of a line or cable 24 preferably of the twisted wire pair type. The other conductor 25 of the line is connected to a bias potential terminal 26.

The emitter follower 18 includes a base terminal 27 coupled to the collector terminal 13, a collector terminal 29 connected to ground potential and an emitter terminal 30 coupled to the conductor 23.

The opposite ends of the conductors 23 and 25 are connected to terminals of a resistor 32 which terminates the twisted wire pair in its characteristic impedance.

A plurality of terminators including terminators 33 and 34 are connected to conductors 23 and 25 by conductors 35, 36 and 37, 38, respectively. Each of the terminators is preferably similar to the details illustrated with respect to the terminator 34. In one application, as many as ten terminators, may be connected to the conductors 23, 25.

The terminator 34 includes a common base amplifier 40 having a base terminal 41 connected to the conductor 38, an emitter terminal 42 coupled to the conductor 37 by way of a current limiting resistor 43 and a collector terminal 44 coupled to a bias potential terminal 45 by way of a load resistor 46.

The output of the terminator 34 drives a common emitter amplifier 47 having a base terminal 48 connected to the collector terminal 44, an emitter terminal 49 connected to ground potential, and an output collector terminal 50.

In operation, the input to the amplifier 10 normally maintains the base emitter junction forward-biased to operate the amplifier 10 in saturation. The potential level at the collector terminal 13 will therefore be slightly negative with respect to ground, and this potential will be applied to the base terminal 27 of the emitter follower 18.

The emitter terminal 30 is connected to the negative bias potential terminal 26 by way of conductor 23, resistor 32 and conductor 25. The base-emitter junction of the emitter follower 18 will therefore be forward-biased to apply a potential which is slightly negative with respect to ground to the conductor 23. Thus the potentials at the emitters such as 42 of terminator 34 will be substantially ground potential minus the voltage drop across that portion of the conductor 23 which is between the emitter of the terminator and the emitter 30 of the emitter follower 18.

The potential at the base terminal 41 will be at a negative value of −6 volts less the drop in potential in the line 25 between the terminal 26 and the base terminal 41. In this fashion, reverse biasing of the base-emitter junction of the amplifier 40 will be assured even when fluctuations in the bias potential supplies occur and even in the presence of the maximum differential noise levels which are encountered in the line 24. Common mode noise picked up on line 24 will be rejected by amplifier 40 because both the emitter 42 and base 41 will see the same change in potential and the reverse bias potential will be maintained. The emitter follower 18 is operated at least close to saturation to deliver a relatively high current to the line 24 which is greater in value than the maximum differential noise levels encountered.

When a positive signal is applied to the base terminal 11 to reverse bias the base-emitter junction of the amplifier 10, the negative potential source at terminal 14 is applied to the base terminal 19 of the emitter follower 17 by way of resistor 15. The difference in voltage at terminals 14 and 21 must supply sufficient current through the resistor 15 to assure forward-biasing of the base-collector junction of the emitter follower 17 to drive the emitter follower heavily into saturation. The emitter follower 17 is capable of delivering a drive pulse to the conductor 23 at a high current level, for example, in one specific embodiment of 300 milliamperes. Since the emitter follower 17 is heavily in saturation, the voltage drop across the emitter collector terminals is maintained at a very low value (e.g., .35 volt), whereby the heating of the transistor is minimized in spite of the high current level.

When emitter followers 17 and 18 are turned on alternatively, each must supply an initial high transient current of short duration to charge the line capacitance of line 24.

For example, the initial drive current of emitter follower 17 can be in the order of 500 milliamperes, after which it returns to a steady-state level of 300 milliamperes.

When the emitter follower 17 is driven to saturation, it applies a potential of approximately −12 volts to the conductor 23. This forward biases the base-emitter junction of the amplifier 40 to turn the amplifier on.

The amplifier 47 is normally held off by the bias potential at the terminal 45. When the amplifier 40 turns on, it turns on the amplifier 47.

In a similar manner, the emitter follower 17 also turns on the amplifiers of the other terminators.

In one specific embodiment using the following component types and values, ten terminators were driven over a 2,500 foot cable with a driver input in the order of 300 milliamperes at approximately 167 kilocycles; however, it will be appreciated that these values are given by way of example and are not intended to limit the scope of the invention. The transistors 10, 18 and 40 were 2N404, 2N576A and 2N388 types respectively. Transistor 17 was a 2N660 with a power dissipation rating of 150 milliwatts at 55 degrees centigrade. The values of resistors 15, 32 and 46 were 430 ohms, 100 ohms and 10,000 ohms, respectively. The value of resistor 43 in terminators spaced from the driver 0 to 300 feet, 300 to 1,100 feet and 1,100 to 2,500 feet was 360 ohms, 270 ohms and 200 ohms, respectively.

With higher speed transistors, the frequency of operation can be increased. The resistance of the conductor 25 and the resistor 43 limit the current of the amplifier 40. The value of the resistor 43 is decreased as it is positioned further from the driver 16 to assure the desired minimum emitter-collector current through the amplifier 40, i.e. 7.5 milliamperes, while preventing excessively high emitter-collector currents.

The polarities of the transistors and the potential sources may be changed in a manner well known in the art to produce similar results, without departing from the spirit and scope of the invention.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A line driver-terminator circuit capable of supplying high currents at relatively high frequencies comprising a line longer than a few hundred feet, including first and second conductors having respective first and second terminals at one end and including an impedance terminating the other end in the characteristic line impedance, a first source of bias potential having a pair of terminals at two differing voltage levels, a second source of bias potential having a voltage level intermediate the levels at the first source terminals and connected to the first terminal of the cable, a pair of complementary emitter followers having their emitters coupled to the second terminal of the cable and having their collectors coupled to respective terminals of the first source of potential, a drive circuit means coupled to the complementary emitter followers and selectively operated to energize alternatively one or the other emitter follower and including means for forward biasing the base-collector junction of at least one of the emitter followers to cause energization of the latter emitter follower to be at a heavy saturation level, and a plurality of terminator circuits each including a common base transistor amplifier having base, emitter and collector terminals, the base terminal being connected to the first conductor at a position intermediate the ends of the line, a current limiting resistor of selected value connecting the emitter terminal of the latter transistor to the second conductor adjacent said intermediate position, and a common emitter transistor amplifier having its emitter terminal connected to the reference potential and its base terminal connected to the collector terminal of the common base transistor amplifier, whereby said one complementary emitter follower provides the base drive current simultaneously for all of the common emitter transistor amplifiers by way of their respective common base transistor amplifiers and resistors.

2. A line driver-terminator circuit capable of supplying currents in the order of three hundred milliamperes over long distances at frequencies in excess of one hundred kilocycles comprising a twisted wire pair in the order of twenty-five hundred feet in length, a reference potential and first and second sources of bias potential having substantially different levels of the same polarity with respect to the reference potential, a load impedance having a first terminal and having a second terminal connected to the higher absolute valued source of bias potential, a complementary emitter-follower circuit including a pair of complementary transistors each having base, emitter and collector terminals, the collector terminal of one complementary transistor being connected to the lower absolute valued source of bias potential and the collector terminal of the other complementary transistor being connected to the reference potential, the emitter terminals of the complementary transistors being connected to one wire of the twisted wire pair adjacent one end thereof, a source of potential having a value intermediate the lower valued source of potential and the reference potential and connected to the other wire of the twisted wire pair adjacent said one end, an impedance terminating the twisted wire pair in its characteristic impedance adjacent the other end thereof, and a transistor inverter having an emitter terminal connected to the reference potential and a collector terminal connected to the first terminal of the load impedance and to the base terminals of the complementary transistors for applying alternatively the reference potential or the higher absolute valued source of bias potential to said terminals to energize alternatively one or the other emitter follower and to cause energization of said one complementary transistor to be at a heavy saturation level, a plurality of terminator circuits each including a common base transistor amplifier having base, emitter and collector terminals, the base terminal being connected to said other wire at a position intermediate the ends thereof, a resistor connecting the emitter terminal of the latter transistor to the said one wire adjacent said intermediate position and having a selected value which is an inverse function of its distance from said one end of the twisted wire pair, and a common emitter transistor amplifier having its emitter terminal connected to the reference potential and its base terminal connected to the collector terminal of the common base transistor amplifier, whereby said one complementary transistor provides the base drive current simultaneously for all of the common emitter transistor amplifiers by way of their respective common base transistor amplifiers and resistors.

3. A line driver-terminator circuit capable of supplying high currents at relatively high frequencies comprising a line in the order of twenty-five hundred feet in length, having first and second conductors, a reference potential and first and second sources of bias potential having substantially different levels of the same polarity with respect to the reference potential, a load impedance having a first terminal and having a second terminal connected to the higher absolute valued source of bias potential, a complementary emitter-follower circuit including a pair of complementary transistors each having base, emitter and collector terminals, the collector terminal of one complementary transistor being connected to the lower absolute valued source of bias potential and the collector terminal of the other complementary transistor being connected to the reference potential, the emitter terminals of the complementary transistors being connected to the first conductor adjacent one end thereof, a source of potential having a value intermediate the lower valued source of potential and the reference potential and connected to the second conductor adjacent said one end, an impedance terminating the line in its characteristic impedance adjacent the other end thereof, and a transistor inverter, having an emitter terminal connected to the reference potential and a collector terminal connected to the first terminal of the load impedance and to the base terminals of the complementary transistors, operated to apply alternatively the reference potential or the higher absolute valued source of bias potential to said base terminals to energize alternatively one or the other emitter follower and to cause energization of said one complementary transistor to be at a heavy saturation level, a plurality of terminator circuits each including a common base transistor amplifier having base, emitter and collector terminals, the base terminal being connected to the second conductor at a position intermediate the ends thereof, a resistor connecting the emitter terminal of the latter transistor to the first conductor adjacent said immediate position and having a selected value which is an inverse function of its distance from said one end of the line, and a common emitter transistor amplifier having its emitter terminal connected to the reference potential and its base terminal connected to the collector terminal of the common base transistor amplifier, whereby said one complementary transistor provides the base drive current simultaneously for all of the common emitter transistor amplifiers by way of their respective common base transistor amplifiers and resistors.

References Cited by the Examiner

UNITED STATES PATENTS

| | | | |
|---|---|---|---|
| 2,995,667 | 8/1961 | Clapper et al. | 307—88.5 |
| 3,053,997 | 9/1962 | Cobbold | 307—88.5 |
| 3,065,358 | 11/1962 | Lee et al. | 307—88.5 X |
| 3,163,829 | 12/1964 | Ladd | 307—88.5 X |

ARTHUR GAUSS, *Primary Examiner.*

I. C. EDELL, *Assistant Examiner.*